United States Patent [19]

Sparks et al.

[11] Patent Number: 5,018,750
[45] Date of Patent: May 28, 1991

[54] SHAFT SEAL ASSEMBLY

[75] Inventors: Richard M. Sparks, Cedar Falls; Kendall D. Tjepkes, Dike, both of Iowa

[73] Assignee: Deere & Company, Moline, Ill.

[21] Appl. No.: 360,953

[22] Filed: Jun. 2, 1989

[51] Int. Cl.5 ............................................. F16J 15/32
[52] U.S. Cl. ........................................ 277/38; 277/95
[58] Field of Search ..................... 277/37, 38, 39, 40, 277/95; 384/482, 484, 486, 488, 489

[56] References Cited

U.S. PATENT DOCUMENTS

| 3,021,161 | 2/1962 | Rhoads et al. | 277/37 |
| 3,135,518 | 6/1964 | Carson et al. | 277/37 |
| 3,363,911 | 1/1968 | McKinven, Jr. | 277/153 X |
| 3,510,138 | 5/1970 | Bowen et al. | 277/35 |
| 4,413,831 | 11/1983 | Washida et al. | 277/40 |
| 4,428,586 | 1/1984 | Romero | 277/38 X |
| 4,721,312 | 1/1988 | Hornberger | 277/38 X |

Primary Examiner—William A. Cuchlinski, Jr.
Assistant Examiner—Scott Cummings
Attorney, Agent, or Firm—Joel S. Carter

[57] ABSTRACT

An oil seal arrangement includes a non-rotating oil ring and a rotating guide ring. A flexible oil seal is bonded to the oil ring and sealingly engages the guide ring to retain lube oil in a bearing chamber. A flexible lip seal and a spacer member rotate with the guide ring and slidably engage portions of the oil ring which are exposed to lube oil and spaced apart from the oil seal.

3 Claims, 1 Drawing Sheet

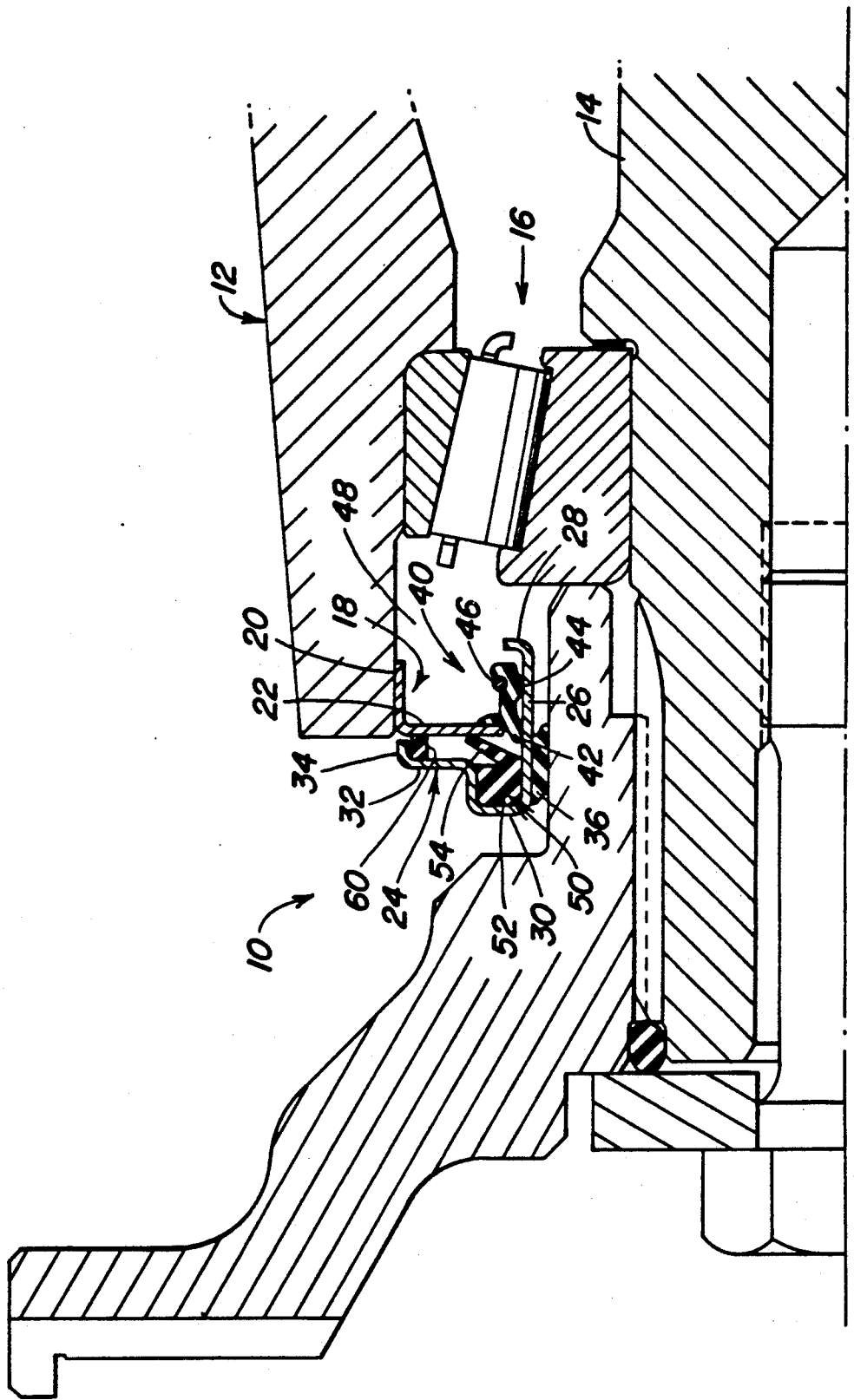

SHAFT SEAL ASSEMBLY

BACKGROUND OF THE INVENTION

The present invention relates to a seal assembly for sealing between a relatively rotating shaft and housing.

Various shaft seal assemblies have been designed for sealing between relatively rotating parts and typically include a metal oil ring fixed relative to one of the parts, a metal guide ring fixed to the other part, a flexible oil seal member fixed to the oil ring and sealingly engaging the other part to retain lubricating oil within the seal assembly and a lip or dust seal between the oil seal ring and the guide ring to protect the oil seal from the exterior environment. Such seal assemblies have also included flexible spacer members made of low friction material fixed to one of the rings for slidable engagement with the other of the members to prevent crushing of the lip seal between the two rings. Such sealing assemblies have had reliability problems due to high temperatures presumably caused by friction between the one of the seal rings and either the lip seal and/or the spacer member. Accordingly, an oil seal assembly is desired which is more resistant to the destructive effects of heat.

SUMMARY OF THE INVENTION

An object of the present invention is to provide a shaft seal assembly which is cool running and more resistant to frictionally generated heat.

This and other objects of the present invention are achieved by the present invention which includes a metal oil ring fixed to a stationary housing and a metal guide ring which rotates with a shaft which rotates within the housing. A flexible oil seal is fixed to the oil ring and slidably and sealingly engages the guide ring to retain lubricating oil within a chamber which encloses bearings which rotatably support the shaft. A lip or dust seal rotates with the guide ring and has a lip which slidably and sealingly engages the oil ring. A spacer member is also mounted for rotation with the guide ring to prevent crushing of the lip seal. The lip seal and the spacer member frictionally engage the oil ring at positions on one side of the oil ring which are directly opposite positions on the opposite side of the oil ring which are exposed to lubricating oil which is then able to absorb and dissipate heat generated in the oil ring by such frictional engagement.

BRIEF DESCRIPTION OF THE DRAWING

The sole figure is a sectional view of a housing and shaft with a seal assembly according to the present invention.

DETAILED DESCRIPTION

The seal assembly 10 of the present invention is mounted between a non-rotating housing 12 and a shaft 14 extending therethrough and supported for rotation therein by conventional bearings 16. The seal assembly includes an annular metal (preferably stamped steel) oil ring 18 with an outer cylindrical portion 20 which is non-rotatably attached to the housing 12 and an annular flange 22 which extends radially inwardly from an axially outer end of the portion 20.

An annular metal (preferably stamped steel) guide ring 24 is mounted for rotation with the shaft 14. Ring 24 includes a radially inner cylindrical sleeve portion 26 with an axially inner, radially inwardly extending lip portion 28, an axially outer annular hub portion 30 and a radially outwardly extending flange 32 with an axially inwardly extending lip 34. An annular rubber member 36 is molded onto and within the cylindrical sleeve portion 26 of the guide ring 24. The rubber member 36 receives the rotating shaft 14 and resiliently couples the guide ring 24 to the shaft 14 for rotation therewith.

A known oil seal 40 (such as described in U.S. Pat. No. 4,376,541 which is incorporated by reference herein) is fixed to the radially inner end of non-rotating ring 18 and has a pair of lips 42 and 44 which sealingly and slidably engage the rotating guide ring portion 26. An annular tension spring 46 helps compress the oil seal 40 onto the guide ring 24. The oil ring 18, the oil seal 40, the guide ring 24 and the rubber member 36 cooperate to enclose a chamber 48 and to retain lubricating oil therein.

A known annular V-ring dust seal 50 (such as available from the Forsheda Shaft Seal Corporation) has a main body 52 received in the annular hub portion 30 of the rotating guide ring 24 and has a lip 54 which extends radially outwardly and axially inwardly therefrom. The end of lip 54 slidably and sealingly engages flange 22 of oil ring 18 and helps prevent contaminants from reaching the oil seal 40. It should be noted that the lip 54 engages the flange 22 at a point which is radially outward from the portion of flange 22 which is contacting the oil seal 40. Thus, lubricating oil in chamber 48 is in contact with the inner side of flange 22 at a point which is directly opposite the point of contact of flange 22 with lip 54. This permits the lubricating oil in chamber 48 to dissipate any heat generated by the frictional engagement between rotating lip 54 and non-rotating flange 22. Heat is also conducted to housing 12 via the metal oil ring 18.

An annular spacer ring or washer 60 is mounted between the guide ring 24 and the oil ring 18 and is preferably received just within the annular lip 34 of guide ring 24. The washer 60 may be resiliently held for rotation with guide ring 24 by the lip 34 wherein the washer 60 would be inserted in a snap-fit manner within the lip 34. The washer 60 is preferably formed out of polyamide material such as "Riton", "Vespel" or "Torlon" or some other similar relatively rigid low friction material. The washer 60 rotates with the guide ring 24 and slidably engages the flange 22 and maintains a desired axial spacing between guide ring 24 and oil ring 18 and prevents crushing of the lip 54. The washer 60 engages the flange 22 of oil ring 18 at a location which is near the radially outer end of flange 22 and immediately adjacent to the outer cylindrical portion 20 and which is directly opposite a part of flange 22 which is directly exposed to lube oil in chamber 48. Thus, any heat generated in flange 22 by the sliding engagement between it and the rotating washer 60 is rapidly dissipated by the lubricating oil in chamber 48 and is conducted to housing 12 via outer cylindrical ring portion 20.

Other known oil seals and dust seals could be used in place of the specific seals shown herein, as long as the frictional engagement with the oil ring is at a similar location so that heat can be readily dissipated by the lube oil.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A lubricated seal arrangement for parts rotating relative to one another, the seal arrangement having a metal oil ring with a cylindrical outer member fixed relative to and engaging one of the parts and an annular flange member extending radially inwardly from the outer member, a metal guide ring fixed relative to the other part, a flexible annular oil seal fixed to a first portion of the oil ring and sealingly and slidably engaging the guide ring, an annular lip seal fixed to the guide ring and slidably and sealingly engaging the oil ring and a spacer member mounted between the oil and guide rings to maintain a clearance therebetween so as to prevent destruction of the lip seal, the spacer member being mounted for rotation with the guide ring and for sliding engagement with the oil ring, the spacer member and the lip seal engaging portions of the oil ring which are spaced apart from the first portion and which are exposed to lubricating oil retained by the oil seal so that heat generated in the oil ring by its sliding engagement with the spacer member is absorbed and dissipated by the lubricating oil retained by the oil ring and oil seal, characterized by:

the spacer member slidably engaging a radially outer part of the flange member immediately adjacent to the cylindrical outer member, whereby heat generated by friction between the spacer member and the flange member is efficiently conducted to the one part via the cylindrical outer member.

2. The seal arrangement of claim 1, wherein:

the guide ring comprises an annular, radially outwardly extending flange and an annular lip extending axially from an outer end of the flange towards the oil ring; and the spacer member is retained in place by the annular lip.

3. The seal arrangement of claim 1, wherein:

the oil seal is bonded to a radially inner portion of the flange member; and the lip seal and the spacer member engaging portions of the flange member which are spaced radially outwardly of the inner portion of the flange member.

* * * * *